(No Model.)
S. H. STUBBS.
PNEUMATIC TIRE.
No. 508,996. Patented Nov. 21, 1893.
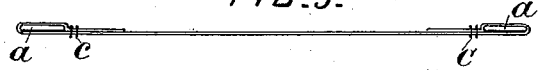
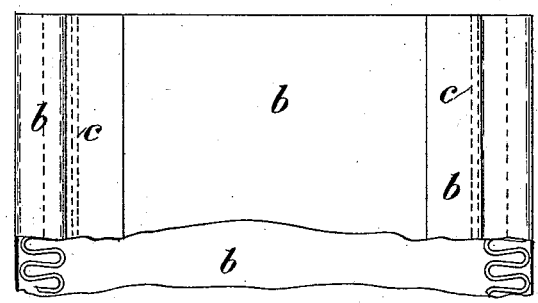
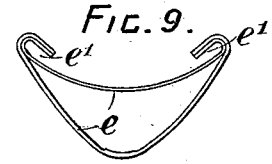
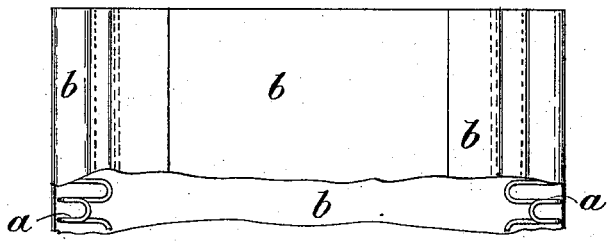
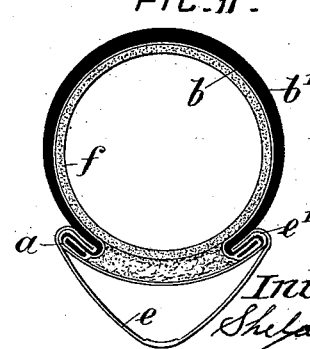
Witnesses:
E. B. Botton
H. Kusterer
Inventor:
Sheldon Harold Stubbs
By Richards &c.
his Attorneys.

UNITED STATES PATENT OFFICE.

SHELDON H. STUBBS, OF LONGSIGHT, ENGLAND.

PNEUMATIC TIRE.

SPECIFICATION forming part of Letters Patent No. 508,996, dated November 21, 1893.

Application filed August 3, 1893. Serial No. 482,251. (No model.) Patented in England December 16, 1891, No. 21,989; in Belgium October 10, 1892, No. 101,679; in France October 10, 1892, No. 224,824, and in Germany October 18, 1892, No. 69,611.

*To all whom it may concern:*

Be it known that I, SHELDON HAROLD STUBBS, a subject of the Queen of Great Britain, and a resident of Longsight, in the county of Lancaster, England, have invented certain new and useful Improvements in Pneumatic Tires for Cycles and other Vehicles, (for which I have obtained patents in Great Britain, No. 21,989, bearing date December 16, 1891; in Germany, No. 69,611, bearing date October 18, 1892; in France, No. 224,824, bearing date October 10, 1892, and in Belgium, No. 101,679, bearing date October 10, 1892,) of which the following is a specification.

My invention relates to improvements in pneumatic tires and in the mode of connecting the same to the wheels of cycles or other vehicles.

In carrying my improvements into effect I form a rubber-tire or outer band with transversely rigid edges adapted to fit over reversely turned over lips upon the rim of the wheel, the lips on the rim being turned over so as to leave shallow grooves of suitable size to receive the rigid edges of the tire or outer band into which grooves the edges may be readily inserted.

Referring to the sheet of drawings forming part of this specification Figure 1, represents a wire bent into a flat zig-zag. Fig. 2 shows two such wires placed in position on a tire or outer band. Figs. 3 and 4 show the edges of the tire or outer band turned back over the wires and fastened in position. Fig. 5 represents a wire similar to Fig. 1 except that part of the wire is bent over so as to form a continuous hook transversely and Figs. 6, 7, and 8 are similar views to Figs. 2, 3, and 4 respectively. Figs. 9 and 10 are sectional views of suitable forms of wheel rims with turned over lips for the purposes of my invention and Figs. 11 and 12 are sectional views of the wheel rims with a pneumatic tube and tire or outer band in position thereon.

Fig. 1 shows a wire $a$ bent into a flat zig-zag as means for stiffening transversely the edges of a tire or outer band. In Fig. 2 two such wires $a$ are shown placed in position on a canvas or other suitable outer band $b$ and in Figs. 3 and 4 the edges of the outer band $b$ are shown turned back over the wires $a$ and fastened securely by stitches $c$ and also by cement if desirable. Figs. 5 to 8 illustrate a similar application of wire borders $a$ to the edges of an outer band $b$ but in this case the wire $a$ after having been bent into a flat zig-zag is then bent into a continuous hook as clearly shown in the drawings.

Figs. 9 and 10 show two suitable forms of hollow wheel rims $e$ for the purposes of my invention. These rims are made of thin steel or other strong and light sheet metal bent to form a trough section and with lips or edges $e'$ turned over on each side of the wheel rim to receive and hold the rigid edges of the tire or outer band $b$. In Fig. 9 the turned over lips are above and in Fig. 10 below the bearing surface of the rim.

Figs. 11 and 12 are views of the two hollow wheel rims $e$ shown in Figs. 9 and 10 respectively with a fully inflated pneumatic tube $f$ and outer band $b$ with its rubber covering or tread $b'$ all secured together and in position by the stiffened edges of the outer band $b$ which are hooked into the turned over lips $e'$ of the wheel rims $e$.

To fasten on the tire or outer band $b$ it must be placed in position on the rim $e$ and its rigid edges inserted into the grooves formed by the turned over lips $e'$ on either side after which it is only necessary to fully inflate the pneumatic tube $f$, and the higher the pressure of inflation the more securely will the rigid edges of the tire $b$ be forced into the grooves and locked under the lips $e'$.

By stiffening the edges of the tire or outer band $b$ by lapping them over zig-zagged wires $a$ as shown and described I add a very slight amount of weight and at the same time obtain perfect rigidity transversely and ample elasticity longitudinally.

Having now described my invention, what I claim as new, and desire to secure by Letters Patent of the United States, is—

1. A pneumatic tire comprising the tube, the band secured thereto, and the zigzag wire reinforce extending along the free edges of the band, substantially as described.

2. In combination, the rim having the hooked edges, the pneumatic tire having the band b and the reinforcing strip for the edges of said band, consisting of the zig zag wires a bent to form a continuous hook to engage the rim, substantially as described.

In witness whereof I have hereunto set my hand in presence of two witnesses.

S. H. STUBBS.

Witnesses:
S. W. GILLETT,
H. PERKINS.